Jan. 12, 1971  F. O. WISMAN  3,555,386
CONTROL APPARATUS FOR MOTORS AND THE LIKE
Filed May 22, 1968  2 Sheets-Sheet 1

INVENTOR:
FRANKLIN O. WISMAN
BY
Howson & Howson
ATTYS

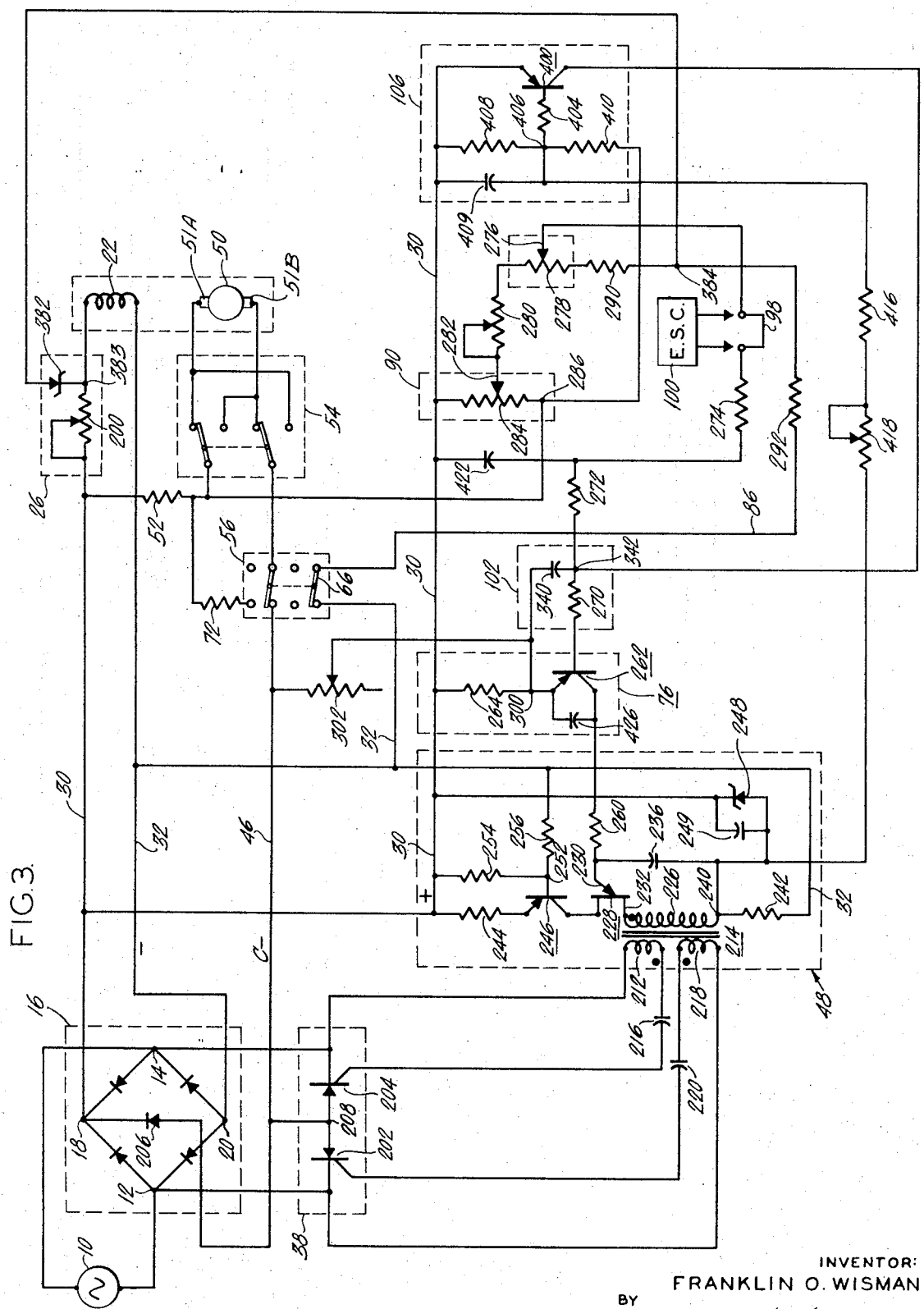

United States Patent Office 3,555,386
Patented Jan. 12, 1971

3,555,386
CONTROL APPARATUS FOR MOTORS AND THE LIKE
Franklin O. Wisman, Chambersburg, Pa., assignor to T. B. Wood's Sons Company, Chambersburg, Pa., a corporation of Pennsylvania
Filed May 22, 1968, Ser. No. 731,104
Int. Cl. H02p 5/16
U.S. Cl. 318—317               20 Claims

ABSTRACT OF THE DISCLOSURE

A speed control circuit for a D.C. shunt-field motor of the class in which the current to the motor armature is controlled by a phase-controlled SCR circuit, the phase angle of operation of the SCR circuit being in turn determined by the timing of trigger pulses from a unijunction relaxation oscillator. The input D.C. control voltage, which may be manually generated or produced by an external instrument, is compared in a closed-loop servo arrangement with a feedback voltage, developed across a feedback resistor, which is indicative of the voltage across the armature; the base-to-emitter dynamic characteristic of a control transistor is used in the error detection process to compare the feedback voltage with the input control voltage. The collector current of the control transistor determines the current fed to the relaxation-oscillator timing capacitor so as to vary the firing angle of the SCR circuit. The internal base-emitter voltage of the control transistor combined with the voltage drop in the above-mentioned feedback resistor provides a convenient voltage-offset level when an external instrument is used to produce the control voltage. The adverse effects of pulsations in the feedback voltage are mitigated by a neutralizing circuit which feeds the higher-frequency pulse components both to the emitter and to the base of the control transistor, an arrangement which at the same time retains adequately fast response to transients and good circuit stability. An improved and simplified transistor circuit is utilized for limiting the maximum current through the armature, in which circuit a voltage indicative of armature current is applied between base and emitter of a transistor so that, when the armature current exceeds a predetermined value, the inherent base-emitter junction voltage of the transistor is exceeded, causing the transistor to turn on and to bypass the nominal control circuit for the control transistor. The effects of line voltage variations and of motor warmup are compensated by deriving a voltage related to the field current of the motor and combining it with the input control voltage of the system by way of a zener diode.

BACKGROUND OF THE INVENTION

This invention relates to apparatus suitable for controlling the energization of a load device, such as a shunt-field D.C. motor. More particularly it relates to improved circuitry for controlling the voltage applied to a motor armature to control its speed in accordance with an input control voltage.

There are a variety of applications in which it is desirable to control the energization of a load device so as to produce and maintain predetermined values of an operating condition thereof in response to corresponding values of a control voltage. While not limited thereto, the invention will be described with particular reference to its application in a circuit for controlling the voltage supplied from an A.C. source to the armature of a shunt D.C. motor so as to vary the speed thereof in a controllable and reproducible manner in response to a variable control voltage. One broad type of circuit for such a purpose which is known in the prior art employs a conventional full-wave rectifier bridge circuit responsive to an alternating-voltage line source for supplying rectified voltage to the motor field winding; the alternating line voltage source is also applied to a phase-controlled rectifier circuit, the output of which supplies voltage pulses to the armature of the motor. The phase-controlled rectifier circuit is normally non-conductive and becomes conductive only in response to triggering pulses applied thereto. Following each such pulse, the controlled rectifier means remains conductive until the cycle of alternating line voltage applied thereto drops below a predetermined level, at which time conduction terminates. Accordingly, the average voltage applied to the armature is determined by the phase relation between the triggering pulses and the cycles of alternating line voltage and, by advancing or retarding the phase of the triggering pulses with respect to the alternating line voltage cycles, the average current supplied to the armature can be varied and the speed of the motor thereby controlled.

Two principal types of triggering circuits for such phase-controlled rectifier circuits have been employed in the prior art, one of which utilizes magnetic amplifiers and the other of which utilizes a relaxation oscillator employing a device such as a unijunction transistor, Shockley diodes, or gaseous discharge tubes to produce triggering pulses in a time phase usually adjusted by varying the series resistance through which the timing capacitor in the relaxation oscillator circuit is charged. The magnetic amplifier circuits are typically characterized by linear response and adaptability to control by external signal means, such as a process monitoring instrument. However, such circuits are inherently relatively heavy, bulky and costly compared to the relaxation oscillator types. The relaxation oscillator type of trigger circuit offers the advantages of lightness, small size and low cost, but in the past has generally been less versatile than the magnetic amplifier type, particularly where it is desired that the motor speed bear a fixed predetermined relationship to the magnitude of an input D.C. control voltage which is varied either by a manual control or by an external instrument.

U.S. Patents Nos. 3,239,742 to Mierendorf et al. and 3,343,055 to Havlicek et al. are exemplary of previous efforts to blend the best feature of the above-mentioned two classes of control systems. Included in this and other prior art are circuits compensating for variations in line voltage, circuits for protecting the motor against excessive armature currents, circuits for mitigating the effects of pulsations in the armature voltage on the control circuitry, and circuits utilizing the base and emitter of a transistor as the error detector in a closed-loop servo control system. However each of these circuits is less than optimum for certain applications.

For example, line voltage compensation is generally desirable because fluctuations in line voltage tend undesirably to change the current through the armature and field winding. However, the current through the field winding also tends to change when the resistance of the field winding changes in response to temperature variations due to motor warm-up, for example, and this will tend to produce corresponding changes in motor speed. Previously-known line-voltage compensation circuits do not correct for the effects of such changes in resistance of the field winding.

Also, while it is known to use a switching transistor actuated by a voltage indicative of excessive armature current to act on a control circuit so as to limit the armature current, such arrangements have in the past utilized a specially-provided source of reference voltage against which to compare the armature-current indicating voltage in order to determine when the armature current has reached an excessive level. Typical reference-voltage sources have been batteries, A.C.-operated rectifiers, and diode devices. Such special reference-voltage sources constitute an additional item of expense, and often suffer from some lack of constancy and/or a lack of sensitivity because the reference voltage is undesirably large. When the reference voltage is large, a large armature-current indicating voltage must be generated, which in turn generally requires use of a resistor of relatively large value in series with the armature, with consequent waste of power and excessive heat dissipation in the resistor.

In addition, while it is known to apply an input control signal to the base of a control transistor and to apply to emitter thereof a pulsating-feedback voltage representative of armature speed, it has been customary to filter the feedback voltage by means of a low-pass filter, so as to remove the interfering higher-frequency pulse components while retaining the average component representative of armature speed. However, the filter then also discriminates against sudden changes in feedback voltage and therefore reduces substantially the ability of the system to respond rapidly and completely to correct for transients.

Furthermore, circuits of the prior art using base and emitter elements of a transistor for error comparison have typically involved interactions between various compensatory regulating voltages which make the circuit difficult to adjust and in some cases unstable or less than completely effective.

Accordingly, it is an object of the invention to provide a new and useful system for controlling the energization of a load device.

Another object is to provide such a circuit which includes a new and useful circuit for protecting against excessive load currents, which is inexpensive, reliable, and results in decreased heat dissipation in the system.

Another object is to provide such a system which includes a new and useful circuit for compensating against the effects of supply voltage changes and of resistance changes due to temperature variations.

A further object is to provide such a system which includes a new and useful circuit for mitigating the deleterious effects of superfluous higher-frequency pulse components on operation of the control system, while also providing rapid response to transients.

Still another object is to provide such a system including a new and useful control circuit of the type using the base and emitter elements of a transistor as the error detector in a closed-loop servo system, which is simple, stable and easily adjusted.

It is also an object to provide such a system including two or more of the foregoing new and useful circuits in combination.

Another object is to provide a new and useful system for controlling the energization of a shunt-field D.C. motor from an A.C. line source.

Another object is to provide a system of the latter type including circuits for producing improvements in one or more of the above-mentioned circuits for protecting against excessive armature current, for compensating for changes in line voltage and field-winding resistance, for mitigating the effects of certain superfluous harmful pulse components, and for providing error detection by base and emitter elements of a transistor.

It is a further object to provide in the latter system a new and useful arrangement for accommodating an input control voltage of the type which is variable over a range having a predetermined lower limit.

SUMMARY OF THE INVENTION

In accordance with the invention, these and other objects of the invention are achieved by the provision of one or more of the following circuits in a control system for a load device such as a shunt-field D.C. motor.

In such a system as applied to the controlled energization of a motor having an armature and a field winding, and in which power supplied to said armature is controlled by a control circuit, resistance means are provided in series with said winding for developing a voltage varying in accordance with variations in current through said winding. Means are provided for applying the voltage variations from the resistance means to the control circuit in the polarity to oppose changes in armature speed due to changes in current through the field winding. Accordingly, when the armature speed tends to increase, for example, because of decreased field current due to a decrease in voltage applied to the field or to an increase in field resistance, the armature voltage is automatically decreased to maintain the speed substantially constant. The circuit therefore compensates for changes in field winding resistance due to motor warm-up, for example. Preferably the path for applying the voltage variations to the control circuit includes a Zener diode operated in its reverse breakdown condition so as to provide the desired matching of D.C. voltage level while transmitting the voltage variations without appreciable change.

Excessive currents in the armature are avoided by a current-limiting circuit of a type which uses the current-switching capabilities of a transistor effectively to shunt or over-ride the normal control circuit when the armature current rises above a predetermined level. For this purpose means are employed for generating a voltage indicative of the armature current, which voltage is applied between base and emitter of a transistor to turn it on when the armature current reaches said predetermined level. The reference voltage against which the armature-current indicating voltage is compared is the "turn-on" voltage of the transistor, i.e. the inherent internal base-emitter voltage drop, which is typically of the order of tenths of a volt. Since this voltage drop is fixed, the reference voltage is very stable; since it is small, the armature-current indicating voltage required to overcome it and turn on the transistor is also small and can be provided by a very small resistance in series with the armature. Accordingly, the power wasted and the heat dissipated in the series resistor are correspondingly small, a factor which is of particular signficance where excessive heat dissipation is a problem.

In control systems of the type in which the input control voltage and an armature-feedback voltage are applied to the two control electrodes of a transducer such as a transistor for comparison, and in which the armature voltage contains superfluous, interfering, higher-frequency components in addition to the information-bearing average component, according to another feature of the invention the control electrodes are interconnected by capacitive means so that the higher-frequency armature-voltage components are applied to both control electrodes and their effects on output of the transducer thereby substantially cancelled. As compared with previously-known filter arrangements for filtering out the undesired higher-frequency components, the circuit of the invention is more effective in permitting rapid response to transients while mitigating the effects of the undesired higher-frequency components.

In forms of my control ssytem using the base and emitter electrodes of a transistor for comparison of an armature-feedback voltage with an input control signal varying over a range having a substantial minimum voltage value, such as is often produced by process-monitoring instruments, it is also a convenient feature of the invention in one aspect that the sum of the internal base-emitter voltage drop in the transistor plus the emitter voltage bias due to idling current in the emitter resistor can be matched to the minimum value of control voltage.

In another aspect of the invention there is provided a motor control circuit in which the emitter and collector elements of a transistor are used for detection of the difference between an input control voltage and a feedback voltage varying with armature voltage, and in which the voltage at the emitter varies with armature voltage independently of current through the armature. Preferably the base circuit then includes the source of input control voltage, and an IR compensation circuit.

Other objects and features of the invention will be more fully understood from a consideration of the following detailed description, taken together with the accompanying drawings, in which:

FIG. 3 is a detailed schematic diagram illustrating in detail the system of FIG. 1.

DETAILED DESCRIPTION OF PREFERRED EMBODIMENTS

Figure 1:
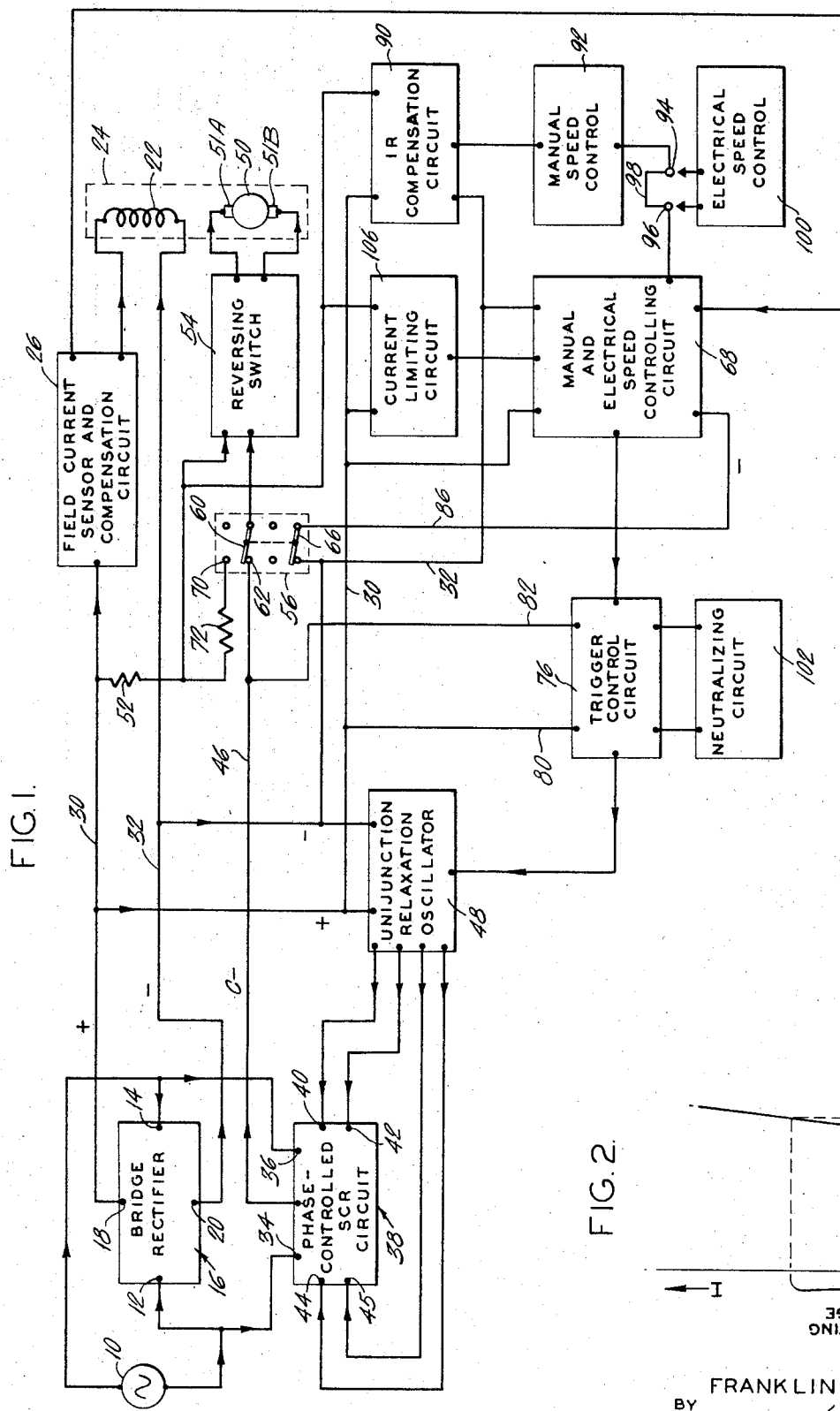
FIG. 1 is a block diagram of one preferred embodiment of the invention.

Referring now to the block diagram of FIG. 1, there is represented therein, by way of example only, one preferred general arrangement of a system embodying the invention which is shown in further detail in FIG. 3. In FIG. 1, an electrical energy source in the form of an alternating line-voltage source 10, such as a 60-cycle 230-volt A.C. line, is connected to one opposite pair of terminals 12 and 14 of a conventional bridge rectifier 16. The bridge output terminals 18 and 20 are connected to the field winding 22 of the motor 24 to be controlled, by way of a field-current sensor and compensation circuit 26 to be described hereinafter. Bridge rectifier 16 provides full-wave rectified current for the field winding 22, the positive voltage fom bridge 16 appearing at line 30 and the negative voltage therefrom appearing at line 32.

The alternating line voltage from source 10 is also applied to the input-power terminals 34 and 36 of phase-controlled SCR (silicon-controlled rectifier) circuit 38. The firing times of SCR circuit 38 are controlled by two sets of trigger pulses supplied to it at its two pairs of trigger input terminals 40, 42 and 44, 45, respectively, from unijunction relaxation oscillator circuit 48. The SCR circuit is preferably of the full-wave type so that its output line 46 is supplied with negative voltage pulses of durations determined by the timing of the trigger pulses from the unijunction relaxation oscillator circuit 48 with respect to the line voltage cycles. Accordingly, the electrical power delivered from source 10 to the armature 50 by the positive supply line 30 and the controlled-negative line 46 is also determined by the timing of the trigger pulses.

To supply operating current to the armature 50 of motor 24, one brush 51A of the armature is connected to the positive line 30 by way of the armature-current sensing resistor 52 and a reversing switch 54, while the controlled-negative line 46 is connected to the other brush 51B of armature 50 through reversing switch 54 and double pole double throw switch 56, which provides switching between a running mode and a braking mode. With switch 56 in the position shown, in which the upper switch arm 60 thereof is closed to contact 62, current is supplied to the armature to run the motor; the lower switch arm 66 of switch 56 is ganged to the upper switch arm 60 and, in the position shown, supplies negative operating voltage from line 32 to the manual and electrical speed control circuit 68 to be described hereinafter. When switch 56 is operated to its upper position the latter negative supply connection is broken, and upper switch arm 60 is closed to contact 70 whereby voltage is removed from across armature 50 and a braking resistor 72 is connected in parallel with the armature to provide dynamic braking thereof. Preferably, switch arm 66 is arranged to close after, and open before, switch arm 60, so that switch arm 60 will not be required to switch large currents. Reversing switch 54 is operable to reverse the direction of rotation of the motor, by reversing the connections to its brushes.

In this example the relexation oscillator is exemplified by unijunction relaxation oscillation circuit 48, which may be of conventional form and is supplied with operating supply voltage from supply lines 30 and 32. Typically it comprises a unijunction transistor connected in circuit with a timing capacitor which is charged by current supplied thereto from a trigger control circuit 76. Trigger control circuit 76 typically comprises a transistor, conduction in which is controlled by the difference in the voltages at its base and emitter electrodes. When the transistor is more conductive, current is fed at a higher rate to the timing capacitor in the relaxation oscillator circuit so that trigger pulses are provided sooner and the SCR circuit 38 is conductive longer, thereby increasing the power supplied to the armature of the motor. In accordance with the invention in one aspect, as will be described in detail hereinafter, the emitter voltage of the transistor is determined by a voltage indicative of the voltage across the armature 50, which is supplied to the trigger control circuit from positive line 30 and controlled-negative line 46, over lines 80 and 82, respectively.

Base voltage for the transistor in the trigger control circuit 76 is supplied from the manual and electrical speed controlling circuitry 68. The latter circuit is supplied with operating supply power from lines 30 and 32, as well as over the switch-controlled line 86. The control voltage which circuit 68 supplies to trigger control circuit 76 is determined by several voltage inputs thereto. One of these voltages is derived directly from across the armature current sensing resistor 52 by way of an IR compensation circuit 90 to be explained hereinafter, a manual speed control 92 (which may be a manually variable resistor by means of which an operator can vary the input control voltage and thus the speed of the motor), and a pair of electrical speed control terminals 94 and 96, which during manual operation are normally shorted by jumper 98 as shown. When the motor speed is to be controlled by a voltage from an external instrument, the portion of the instrument producing the control voltage, which is designated in FIG. 1 as electrical speed control 100, is connected between terminals 94 and 96 and the jumper 98 removed, whereby the external voltage is introduced into the input of the manual and electrical speed controlling circuit 68.

The invention portions of the system of FIG. 1 include the detailed arrangement of the trigger circuit 76 and its connection with IR compensation circuit 90, the neutralizing circuit 102, the field current sensor and compensation circuit 26, and the current-limiting circuit 106, all of which will be described in detail in connection with FIG. 3 hereof. In brief, the neutralizing circuit 102 is connected to trigger control circuit 76 in such a way as to obviate the effects of certain interfering variations in the feedback voltage supplied to the emitter of the transistor in trigger control circuit 76. The field current sensor and compensation circuit 26 serves to sense field current variations due to factors such as variations in input line voltage and in field resistance due to motor warm-up, and to supply a compensating voltage to the manual and electrical speed controlling circuit 68. Current-limiting circuit 106 responds to increases in armature current beyond a predetermined maximum safe level to modify the operation of the manual and electrical speed controlling circuit 68 in such manner that the armature current is reduced and prevented from exceeding the latter maximum level.

The overall function of the circuit of FIG. 1 then is to control the speed of motor 24 so that it will have one definite predetermined value for any given setting of the manual speed control 92, or for any given value of the voltage from electrical speed control 100 when it is being utilized, provided the armature current does not increase beyond a predetermined safe level.

The details of the preferred embodiment of the invention will now be described with particular reference to FIG. 3, in which parts corresponding to those of FIG. 1 are indicated by corresponding numerals.

As shown in FIG. 3, the bridge circuit 16 to which the alternating line source 10 is connected comprises a conventional arrangement of four diodes in bridge configuration, the output terminals 18 and 20 of which bridge are connected to field winding 22 through the variable series resistor 200, which is part of the field-current sensor and compensation circuit 26 of FIG. 1, as will be described hereinafter. Resistor 200 is adjusted initially to an appropriate value for any given application and left fixed thereafter. Resistor 200 is normally of relatively small value, for example, ten ohms or less, so that the voltage across it is substantially proportional to the current through the field winding.

The SCR circuit 38 in this example comprises a conventional arrangement of two silicon controlled rectifiers 202 and 204, the cathodes of which are connected, respectively, to the bridge input terminals 12 and 14 to which the line voltage is supplied from source 10. The anodes of the silicon controller rectifiers are directly connected together, and a so-called "free wheeling" diode 206 is preferably connected between the junction point 208 of the latter anodes and the upper, or positive, output terminal 18 of bridge 16, for purposes well known in the art. The cathode and gate electrodes of the silicon controlled rectifier 204 are connected across the secondary winding 212 of transformer 214 by way of D.C. blocking capacitor 216, while the cathode and gate electrodes of silicon controlled rectifier 202 are connected across the secondary winding 218 of transformer 214 by way of D.C. blocking capacitor 220.

The unijunction relaxation oscillator 48 which produces current pulses through the primary 226 of transformer 214 to turn on the silicon controlled rectifiers in proper time-phase relationship comprises a unijunction transistor 228 having an emitter electrode 230 and a first base electrode 232, between which is connected the series combination of transformer primary 226 and timing capacitor 236. The junction point 240 between transformer primary 226 and capacitor 236 is connected to the negative supply line 32 by way of resistor 242, and positive supply voltage for unijunction transistor 228 is supplied from the positive supply line 30 by way of resistor 244 and the emitter-to-collector path of a pnp transistor 246. A Zener diode 248 and a capacitor 249 may be connected in parallel with each other, between positive supply line 30 and junction point 240, to hold the voltage between the latter points at a fixed value.

The base of transistor 246 is connected to the junction point 252 on a voltage divider made up of biasing resistors 254 and 256 connected in series between the positive supply line 30 and the negative supply line 32, to provide normal operating bias for transistor 246.

The emitter of unijunction transistor 228, and the upper plate of capacitor 236, are connected to the positive supply line 30 by way of the series combination of resistor 260, the collector and emitter electrodes of a trigger control transistor 262, and resistor 264. Accordingly, when unijunction transistor 228 is non-conductive, capacitor 236 charges up toward the voltage of supply line 30 at a rate determined by the resistance of resistors 260 and 264 and the effective resistances of the emitter-to-collector path in trigger control transistor 262. When capacitor 236 has charged to the point at which the emitter voltage of unijuncation transistor 228 exceeds a critical threshold value, which is a fixed fraction of the interbase voltage of the transistor, unijunction transistor 228 abruptly becomes conductive and capacitor 236 is at least partially discharged by way of emitter 230, first base electrode 232 and transformer primary 226, thereby producing in the latter transformer primary a trigger pulse for operating the silicon controlled rectifier circuitry. This discharging of capacitor 236 will occur at least once for each half cycle of the full-wave rectified line voltage, at a time in the cycle determined by the effective emitter-to-collector resistance of trigger control transistor 262. When the latter resistance becomes lower, capacitor 236 will charge more rapidly and triggering pulses for the silicon controlled rectifier will occur earlier in the cycle, thus delivering more power to the armature 50, and higher values of resistance of the trigger control transistor reduce the power delivered to the armature.

At the end of each half cycle of supply voltage it is desirable to ensure that capacitor 236 is discharged completely before the next charging cycle begins. In the preferred embodiment shown in FIG. 3 this is accomplished by means of the gating transistor 246, which is normally biased into conduction by resistors 254 and 256 when the supply voltage at lead 30 is at a relatively high voltage portion of its cycle, but which becomes non-conductive as this supply voltage decays toward the end of each half cycle thereof. This termination of conduction in gating transistor 246 in turn causes the interbase voltage of unijunction transistor 228 to collapse, permitting capacitor 236 to discharge substantially completely. While such a gating circuit for producing complete capacitor discharge is preferred, it is not necessary in all applications, and instead the second base of transistor 228 may be connected directly to resistor 244, in which case resistors 254 and 256 and capacitor 249 may be eliminated.

Unijunction transistor oscillator circuits per se, and silicon controlled rectifier circuits for use therewith, being well known for purposes of controlling the delivery of power to a motor, it is unnecessary further to describe typical constructions and operations thereof.

Upon the occurrence of each trigger pulse applied to the silicon controlled rectifier circuit 38, operating voltage and current are supplied to armature 50 from positive supply line 30 and controlled-negative line 46 by way of switches 56 and 54. As can be seen, switch 54 is a conventional reversing switch arrangement which, upon operation, will reverse the polarity of connection of lines 30 and 46 to armature 50, thus reversing the motor direction. The nature and function of switch 56 is as described previously in connection with FIG. 1.

The effective resistance of the emitter-to-collector path in trigger control transistor 262, which determines the timing of the trigger pulses and hence the rate of delivery of power to the armature, is determined by the base-to-emitter voltage of transistor 262. More particularly, the collector current delivered by transistor 262 to timing capacitor 236 is determined by the base-to-emitter current in transistor 262, which in turn is determined by the base-to-emitter voltage. It is noted that the base electrode of transistor 262 is connected to the positive supply line 30 through the series combination of fixed resistors 270, 272 and 274, the jumper 98, the variable tap 276 which serves as the manual speed control, the upper portion of the variably-tapped resistor 278, the variable resistor 280 serving as a minimum speed limiting control, the variable tap 282, and a portion of the resistance of variably-tapped resistor 284, which constitutes a so-called IR compensation circuit. The lower end of the variably-tapped resistor 284 is connected to the junction point 286 between armature-current sensing resistor 52 and armature 50, so that IR compensation resistor 284 is in series with the armature 50. The lower end of variable-tapped resistor 278 is connected to the negative supply line 32 by way of series resistors 290 and 292 and switch arm 66 of switch 56. Operation of switch 56 to its braking position opens the latter circuit, thereby disconnecting the negative supply line 32 from resistor 292 and causing transistor 262 to become cut off so that trigger pulses are no longer generated.

The voltage supplied to the base of trigger control transistor 262 therefore varies with the setting of the manual speed control tap 276 on resistor 278; or, if this tap is fixed in position, jumper 98 removed, and the external voltage source 100 connected between jumper contacts 94 and 96, the base voltage of the transistor 262 will vary with the externally-applied voltage. The lower the position of tap 276, the more negative the base voltage of transistor, greater the conduction therein, and the greater the amount of power delivered to the armature 50.

It is also noted that the base voltage of transistor 262 is derived from a tap on the IR compensation resistor 284, which is connected in series with the armature 50 so that if the current in the armature is increased due to added load on the motor, the voltage drop between positive supply line 30 and IR compensation tap 282 will increase, making the base of transistor 262 more negative and supplying more power to the armature. This provides compensation for the IR drop (armature current I, multiplied by armature resistance R) within the armature winding with varying loads on the motor. The amount of this compension which is introduced is determined by the setting of the tap 282, becoming greater as the tap is lowered on resistor 284.

The emitter of trigger control transistor 262 is connected to the junction point 300 between resistor 264 and a variable resistor 302, the other terminal which is connected to the controlled-negative line 46. It is noted that the voltage developed between the positive supply lead 30 and controlled-negative lead 46 is proportional to motor speed, subject to a normally small correction for IR compensation, and the voltage supplied to the emitter junction point 300 of transistor 262 is proportional to this armature voltage, the proportionality being settable by adjustment of variable resistor 302. Accordingly, as the base voltage of transistor 262 is made more negative by input control voltage, the motor tends to speed up and thereby develop a preater voltage at the emitter of transistor 262; this change in emitter voltage reduces the base-emitter voltage of transistor 262, and hence opposes the effect of changes in base voltage and limits the motor speed. Each time the base voltage of transistor 262 is thus changed, the motor speed will change correspondingly until the emitter voltage has followed to maintain a small difference between base and emitter voltage, the system thereby acting as a closed servo loop.

In addition to the voltages applied to the base and emitter of transistor 262, there is also present a built-in or inherent base-to-emitter voltage drop in transistor 262, which for a typical silicon transistor is of the order of 0.62 volt. Accordingly, before any appreciable conduction occurs in transistor 262, the base voltage thereof must become negative with respect to supply line 30 by 0.62 volt plus whatever drop in voltage exists in resistor 264 due to idling current therein. This provides a definite threshold base voltage for operation of transistor 262, which is advantageous in many applications. More particularly, many known process monitoring instruments provide an output voltage having a predetermined minimum value, for example a voltage variable in a range between one and five volts. When the output voltage of such an instrument is to be utilized for speed control and is connected to the terminals 94 and 96 in place of jumper 98, resistor 264 may be adjusted so that the sum of the idling-current voltage drop in resistor 264 and the internal base-to-emitter voltage drop of transistor 262 is equal to one volt, thereby causing operation of the motor to start at the one-volt offset level as desired.

Figure 2:
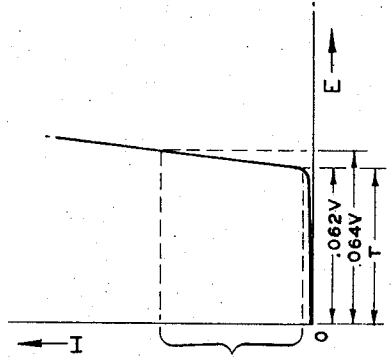
FIG. 2 is a graphical representation to which reference will be made in explaining the operation of the invention in one form.

It is noted that the base emitter elements of transistor 262 serve as an error detector or null circuit for sensing the difference between the fed back emitter voltage and the applied base control voltage. Transistor 262 therefore produces an unexpectedly powerful amplification because of the inherent steep dynamic resistance characteristics of the base-emitter junction. Thus, referring to FIG. 2 in which ordinates represent base-to-emitter current and abscissae represent base-to-emitter voltage in the forward direction, it is seen that once the base-to-emitter voltage exceeds the minimum threshold voltage T below which substantially no current is produced, the current then rises extremely steeply with further increases in voltage, and it is along this latter steep portion of the curve that regulating action normally takes place. Accordingly very small differences in base-to-emitter voltage produce large base-to-emitter current changes, which in turn produce large collector current changes and resulting sensitive control of the triggering phase of the unijunction oscillator. For example, 20 millivolts of variation in base-to-emitter voltage and currents less than 15 microamperes at transistor 262 are ample to drive the pulse generator 48 from zero to its maximum required firing angle, e.g. 130°.

It is also noted that the feedback signal applied to the emitter of trigger control transistor 262 is not a smooth D.C. voltage, but instead consists of large narrow spikes due to the firing of the controlled-rectifier circuit for only a portion of each half cycle of line voltage. For purposes of control of the operation of trigger transistor 262, only the average or D.C. component of this voltage is required, since this is representative of motor speed, and the large pulse components produce superfluous base-to-emitter voltage variations at transistor 262 which tend to interfere with system operation. In the prior art it has been conventional to filter out such undesired components by conventional filtering elements. However, when this is done, the filter also prevents that rapid response of the system which is desired for example upon the occurrence of transients which are to be counteracted by operation of the system.

To overcome this limitation in accordance with one feature of the invention, a neutralizing capacitor 340 is connected between the emitter and base of transistor 262, in this case directly between the emitter and the junction point 342 between resistors 270 and 272. In the absence of this capacitor, application of a typical feedback pulse to the emitter of transistor 262 would make the emitter suddenly strongly negative and tend to cut off conduction in the transistor. However, capacitor 340 applies the latter negative pulse also to the base of transistor 262 in substantially equal magnitude, so that the difference between the base and emitter voltages is not materially changed and the base-emitter control current therefore remains substantially constant. The optimum values of capacitance for capacitor 340 and the optimum resistance values for resistors 270 and 272 are preferably determined by experimental variation in order to obtain greatest degree of constancy of base-to-emitter voltage consistent with desired transient response. It is noted that while the stability of the system is thereby enhanced, the system is still able to respond rapidly to transients, such as may be due to sudden application or removal of heavy loads.

Another feature of the circuit of the invention lies in the arrangement for providing compensation against line voltage variation and against the effects of motor heating on the resistance of the motor field. The compensation circuit for providing this function comprises the field-current sensing resistor 200 in series with field winding 22, and the Zener diode 382 connected from the junction point 383 between resistor 200 and field winding 22 to the junction point 384 between resistors 290 and 292; the Zener diode 382 is poled so that its anode is connected to the junction point 384, and provides a predetermined constant voltage drop so as to match the voltage level in the field circuit to that in the speed control circuit while permitting the voltage at junction 384 to follow changes in the voltage drop in series resistor 200. It will be understood that if the line voltage decreases or the motor field overheats so that the field winding resistance increases, there will be a tendency for the motor to speed up. At the same time, the current through the field winding will decrease, as will the current through series resistor 200, thereby applying a less negative voltage to junction point 384, reducing the current through trigger control transistor 262, and thereby reducing the power supplied to armature 50 to counteract the tendency for the motor to speed up.

Another important feature of the invention resides in the simplified and improved current limiting circuit for shunting the speed control circuit when for any reason the armature current tends to increase beyond a predetermined safe threshold value. It is known in the prior art to accomplish a similar function by comparing a signal proportional to armature current with a reference potential derived from a battery, a transformer and rectifier-filter combination, or a voltage drop in a special external reference diode. In the system of the invention, this function is accomplished by an arrangement which employs the inherent base-to-emitter junction voltage of the shunting transistor as the reference voltage, eliminating the need for a separate source of reference voltage and providing more efficient system operation with less heat dissipation in the equipment.

To implement this feature, there is provided a transistor 400, the emitter electrode of which is connected to the positive supply line 30 and the collector electrode of which is connected to the junction point 342 between resistors 270 and 272 at the base of the signal control transistor 262. When transistor 400 is non-conducting, this circuit has no effect upon operation; however, when transistor 400 is rendered conductive, it shunts the negative control signal applied between the base of transistor 262 and common positive supply line 30, thereby cutting off the control transistor 262 and retarding the phase of trigger pulses.

To accomplish this operation, the base of transistor 400 is connected through a series resistor 404 to a junction point 406 between resistors 408 and 410, the latter resistors being connected in series with the armature 50. The pulses of current through the armature therefore produce a voltage at junction point 406 which is applied to the base of transistor 404, the greater the armature current the more negative the junction point 406; the pulses of voltage so applied are preferably smoothed by the capacitor 409 in parallel with resistor 408. An adjustable current for reducing the effective threshold of transistor 400 may be supplied by way of fixed resistor 416 and variable resistor 418, although in certain applications this may be omitted. When the current through the armature 50 rises to the threshold level at which the voltage across smoothing capacitor 409 overcomes the inherent base-emitter junction voltage of transistor 400 and renders the transistor conductive, the transistor effectively short-circuits the normal base control circuit for trigger control transistor 262, to limit conduction therein as desired. Because the transistor threshold level is relatively low, e.g. 0.62 volt for a silicon transistor or 0.2 volt for a germanium transistor, the circuit operates at lower levels than previously-known circuits, and therefore permits use of a smaller value of resistor 52, with a consequent major reduction in heating loss and in cooling requirements for cabinets housing the equipment. In addition, no special reference-voltage device external to transistor 400 is required.

Capacitor 422 and resistor 274 may be employed to provide a timed ramp start in a manner which is well known to those skilled in the art and hence need not be described further. Capacitor 426 is included in certain preferred embodiments to smooth transition irregularities which may arise at higher speeds when the controlled rectifier firing angle exceeds 90° and the idling current for a second pulse each half cycle traverses the charging circuit, as is known.

Accordingly it will be appreciated that there has been provided a system for controlling power to a load which is simple, inexpensive and effective, which is efficient with respect to dissipation of power and heat, which is stable yet capable of rapid response, and which incorporates simple and effective means for compensating for line voltage changes and field-winding heating.

Without thereby in any way limiting the scope of the invention, the following typical values of various parameters and components for a circuit like that of FIG. 3 are privided in the interest of complete definiteness.

Line voltage—230 volts A.C.
Resistor 200—0–10 ohms
Resistor 52—0.06 ohm
Resistor 72—35 ohms
Unijunction transistor 228—Type 2N2647
Transistors 246, 262 and 400—Type 2N3906
Resistor 242—33,000 ohms
Resistor 244—150 ohms
Resistor 254—4,700 ohms
Resistor 256—100,000 ohms
Resistor 260—4,700 ohms
Resistor 264—680 ohms
Resistor 302—0–50,000 ohms
Resistor 416—100,000 ohms
Resistor 418—0–250,000 ohms
Resistor 270—4,700 ohms
Resistor 272—4,700 ohms
Resistor 274—4,700 ohms
Resistor 292—19,000 ohms
Resistor 290—7,500 ohms
Resistor 278—5,000 ohms
Resistor 280—0–2,000 ohms
Resistor 284—100 ohms
Resistor 404—15,000 ohms
Resistor 408—33,000 ohms
Resistor 410—6,200 ohms
Capacitor 236—.1 microfarad
Capacitor 249—.47 microfarad
Capacitor 426—.047 microfarad
Capacitor 340—6.4 micröfarad
Capacitor 422—50 microfarads
Capacitor 409—50 microfarads.

While the invention has been described with specific reference to preferred embodiments thereof in the interests of complete definiteness, it will be understood that it may be embodied in any of a variety of forms diverse from those illustrated without departing from the scope of the invention as defined by the appended claims.

What is claimed is:

1. In a control system for controlling the speed of a motor having an armature and a field winding by varying the electrical power supplied to said armature, said field winding being supplied with a field current which is nominally constant but subject to variations due to changes in the resistance of said winding or in the voltage applied thereto, said control system comprising a control circuit having its output connected to said armature and responsive to variations in a control voltage applied to said control circuit to vary said electrical power supplied to said armature without thereby changing said field current substantially, said control voltage being controlledly variable independently of said field current, the improvement which comprises:
   resistance means in series with said field winding for developing a voltage varying in accordance with variations in the current through said field winding; and
   means for applying said varying voltage to said control circuit to change said electrical power supplied to said armature in the sense to oppose changes in the speed of said motor due to said variations in said field current.

2. The apparatus of claim 1, in which said last-named means comprises a Zener diode connected from a point between said resistance means and said field winding and a point in said control circuit, said Zener diode being poled so as to operate in its reverse breakdown condition.

3. The apparatus of claim 2, in which said motor is a shunt-type D.C. motor.

4. A control system for a shunt-type D.C. motor having an armature and a field winding, comprising:
  a source of direct voltage for supplying current to said field winding, said current being nominally constant but subject to variations due to changes in the resistance of said winding or in said direct voltage;
  resistance means connected in common series circuit with said source and said field winding for developing voltage variations corresponding to variations in current through said field winding;
  means for supplying operating current to said armature;
  armature voltage control means responsive to variations in a control voltage applied thereto to vary the voltage applied to said armature without thereby changing said field current substantially, and
  means for generating said control voltage and for applying it operatively to said control means;
  said control voltage generating means comprising means responsive to said voltage variations for varying said armature voltage in the direction to increase said armature voltage when said field winding current increases.

5. The system of claim 4 in which said armature voltage control means comprises a first transistor having base, emitter and collector electrodes, a reference-potential line, means for applying between said reference-potential line and said emitter electrode a voltage representative of the voltage across said armature, means for applying said control voltage between said reference-potential line and said base electrode, and means for varying said armature voltage in response to variations in the current through said collector electrode without thereby varying substantially said field current.

6. The system of claim 5, comprising capacitive means interconnecting said emitter and base electrodes whereby higher-frequency components of said armature voltage are applied substantially equally to said base and emitter electrodes.

7. The system of claim 6, comprising circuit means for limiting the current in said armature to a predetermined maximum value, said circuit means comprising a second transistor having its emitter-to-collector path connected effectively in parallel with said control-voltage generating means, means for generating a voltage representative of current through said armature, and means for applying said armature-current representative voltage between said base and emitter electrodes of said second transistor to render it conductive whenever said armature-current representative voltage increases to a level greater than the internal base-emitter junction voltage of said second transistor.

8. In a system for controlling the current in a load device, which system includes a control circuit for varying the current in said load device in response to an input control signal, circuit means for limiting the current in said load service substantially to a predetermined maximum value comprising:
  means for generating a voltage indicative of the current in said load device;
  means for comparing said voltage with a reference voltage and for over-riding said input control signal when said current-indicating voltage rises above said reference voltage, thereby to limit said current to said predetermined maximum value;
  said last-named means comprising a transistor having emitter, base and collector electrodes, said reference voltage comprising the internal base-emitter junction voltage in said transistor.

9. The apparatus of claim 8, in which said load device comprises a motor armature, and in which said voltage-generating means comprise resistance means in series with said armature across which said current-indicating voltage is generated, at least a part of said current-indicating voltage being applied between base and emitter of said transistor, said junction voltage drop being less than said current-indicating voltage when said current has said predetermined maximum value, the emitter-to-collector path of said transistor being in parallel with said control circuit so as to over-ride said input control signal when said transistor becomes conductive.

10. In a control system for controlling the operating condition of a load device comprising control signal input means for developing a control signal, feedback circuit means for deriving a feedback signal indicative of said operating conditition, and amplifying means supplied at a first input terminal thereof with said control signal and at a second input terminal thereof with said feedback signal to produce an amplifier output signal at the output terminal of said amplifying device for controlling said operating conditition in accordance with the difference in voltage between said first and second terminals, the improvement which comprises:
  capacitive means connected between said first and second terminals for applying to said first terminal higher-frequency pulse components of said feedback signal, thereby substantially to nullify the effects of said pulse components on said output signal while leaving said amplifier responsive to variations in the average component of said feedback signal.

11. The apparatus of claim 10, in which said load device is the armature of a motor, said operating condition is the speed of said armature, and said amplifying device is a transistor.

12. The apparatus of claim 11, in which said first and second terminals are the base and emitter electrodes respectively of said transistor and said output terminal is the collector electrode of said transistor.

13. The apparatus of claim 12, comprising resistance means having one of its terminals connected to said base electrode and its other terminal supplied with said control signal, said capacitive means being connected directly between said emitter electrode and said other terminal of said resistance means.

14. The apparatus of claim 12, including unijunction relaxation oscillator means comprising second capacitive means supplied with current from said collector electrode for producing trigger pulses at times dependent upon the magnitude of said collector current, a source of current for supplying current to said armature, and controlled rectifier means connecting said current source to said armature and supplied with said trigger pulses for controlling the current supplied to said armature in accordance with variations in the timing of said trigger pulses.

15. The apparatus of claim 14, in which said feedback means comprises resistive means connected across said armature, said emitter electrode being connected to a tap point on said last-named resistive means.

16. A system for controlling energization of an electrical load device in response to an input control voltage, comprising:
  a source of electrical energy for energizing said load device;
  power control means connecting said source across said load device and responsive to pulses applied thereto to vary the energization of said load in accordance with variations in the timing of said pulses;
  current-controlled relaxation oscillator means for generating said pulses with a timing dependent upon the magnitude of a control current supplied thereto;
  a control transistor having emitter, base and collector electrodes, said collector electrode being connected to supply said control current to said oscillator means;
  means supplying said base electrode with said input control voltage; and
  resistance means connected across said load device for supplying said emitter electrode with a voltage dependent upon the voltage across said load device but independent of the current through said load device.

17. The system of claim 16, comprising second resistance means in series with said load device for developing a voltage indicative of current through said load device, and means for combining said last-named voltage additively with said control voltage.

18. The system of claim 17, in which said load device comprises the armature of a shunt D.C. motor having a field winding, and comprising additional resistance means in series with said field winding for developing a voltage varying in accordance with current through said field winding and means for combining said voltage variations additively with said control voltage.

19. In a control system for applying a controllably variable voltage to a load device to control an operating condition thereof:
   a transistor having emitter, base and collector electrodes;
   means for controlling said operating condition in response to variations in the collector current of said transistor;
   means for deriving a feedback voltage and for applying it between said emitter electrode and a reference point, said feedback voltage varying with the voltage across said load device and having a predetermined minimum value when said operating condition is at the lower limit of its controlled range;
   a source of an input control voltage variable through a range having a predetermined lower limit; and
   means for applying said input control voltage between said base electrode and said reference point;
   said predetermined minimum value of said input control voltage being substantially equal to the algebraic sum of said minimum value of feedback voltage plus the internal base-emitter junction voltage in said transistor.

20. A system for controlling the voltage across the armature of a shunt-type D.C. motor having a field winding, comprising:
   a source of alternating line voltage;
   means for rectifying said line voltage;
   means for applying the rectified line voltage across said field winding;
   controlled-rectifier means;
   means supplying said line voltage to said controlled-rectifier means;
   means supplying the output of said controlled-rectifier means to said armature;
   unijunction relaxation oscillator means comprising a timing capacitor for generating trigger pulses to trigger said controlled-rectifier means in a phase relation to the cycles of said line voltage which is determined by the charging current supplied to said timing capacitor, thereby to control the voltage supplied to said armature;
   a first transistor having its collector connected to said timing capacitor to supply said charging current thereto;
   means for applying a feedback voltage, representative of the voltage across said armature, between the emitter electrode of said transistor and a reference potential point;
   means for generating a controlledly variable input control voltage between the base of said transistor and said reference potential point, said last-named means comprising first resistance means in series with said armature and a variable tap thereon for deriving said input control voltage;
   second resistance means in series with said field winding, and a Zener diode operated in its reverse-breakdown condition connecting said second resistance means to said control-voltage generating means for deriving voltage variations indicative of changes in field current and for combining them additively with said input control signal in a polarity to oppose changes in armature current due to said changes in field current;
   a second transistor having its emitter-to-collector path connected between said reference potential point and said base of said first transistor to over-ride said input control voltage and limit the current through said armature when said second transistor is rendered conductive; and
   means responsive to voltage developed in said first resistance means for applying between the base and emitter of said second transistor a voltage which rises above the internal base-emitter junction voltage thereof when said armature current rises above a predetermined maximum safe lever thereof, thereby to turn on said second transistor and limit said armature current.

References Cited

UNITED STATES PATENTS

| | | | |
|---|---|---|---|
| 3,295,040 | 12/1966 | Schieman | 318—332 |
| 3,435,316 | 3/1969 | Wilkerson | 318—338 |
| 3,458,790 | 7/1969 | Wilkerson | 318—338 |

ORIS L. RADER, Primary Examiner

H. HUBERFELD, Assistant Examiner

U.S. Cl. X.R.

318—338, 345, 347, 356, 358